United States Patent [19]

Reisdorf

[11] Patent Number: 5,465,683
[45] Date of Patent: Nov. 14, 1995

[54] BIRD FEEDER AND METHOD OF MAKING

[76] Inventor: Alfred Reisdorf, 2604 - 41 Street, Edmonton, Alberta, Canada, T6L 5J8

[21] Appl. No.: 307,168

[22] Filed: Sep. 16, 1994

[30] Foreign Application Priority Data

Nov. 10, 1993 [CA] Canada ................................ 2102829

[51] Int. Cl.⁶ .................................................. A01K 39/00
[52] U.S. Cl. .................................................. 119/52.2
[58] Field of Search ................................ 119/52.1, 52.2, 119/52.4, 53.5, 54, 55, 57.8

[56] References Cited

U.S. PATENT DOCUMENTS

| | | | |
|---|---|---|---|
| 980,367 | 1/1911 | Vancil | 119/52.4 |
| 1,993,445 | 3/1935 | Hemstreet | 119/52.2 |
| 2,643,637 | 6/1953 | Lewis | 119/52.1 X |
| 2,827,876 | 3/1958 | Trobaugh | 119/52.4 |
| 3,094,973 | 6/1963 | Devall | 119/57.8 |
| 3,249,090 | 5/1966 | Ripley | 119/52.1 |
| 4,408,565 | 10/1983 | Kerbs et al. | 119/52.2 |
| 5,078,098 | 1/1992 | Ragen | 119/52.2 |

*Primary Examiner*—Paul J. Hirsch
*Assistant Examiner*—Thomas Price
*Attorney, Agent, or Firm*—Anthony R. Lambert

[57] ABSTRACT

A bird feeder construction kit is described which includes the following components. A base is provided having a central trough-like depression with vertically extending pins adjacent opposed ends of the depression. A pair of supports are provided which are vertically securable to the base. Each support has three projecting pins. Three rectangular plates are also provided. The kit can be shipped flat through the mail. It is assembled by securing the supports vertically to the base and then sliding the plates into position to rest against the pins.

2 Claims, 2 Drawing Sheets

BIRD FEEDER AND METHOD OF MAKING

BACKGROUND OF THE INVENTION

In order to facilitate delivery and storage of products, a variety of products are presently sold in the form of kits. The kits must be capable of being shipped flat and must be easy for the consumer to assemble after purchase. It often takes considerable ingenuity to develop a kit for a product. Bird feeders are not products commonly sold in kit form.

SUMMARY OF THE INVENTION

What is required is a bird feeder construction kit.

According to the present invention there is provided a bird feeder construction kit which includes the following components. A base is provided having a central trough-like depression with vertically extending pins adjacent opposed ends of the depression. A pair of supports are provided which are vertically securable to the base. Each support has three projecting pins. Three rectangular plates are also provided.

The bird feeder construction kit can easily be sent through the mail. In order to assembly the bird feeder kit, the supports are vertically secured to the base. The plates are then slid into position and rest against the pins to maintain the bird feeder in an assembled condition. It is preferred that the plates be of a transparent material. This provides a better view of the birds and of the level of feed remaining in the feeder.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
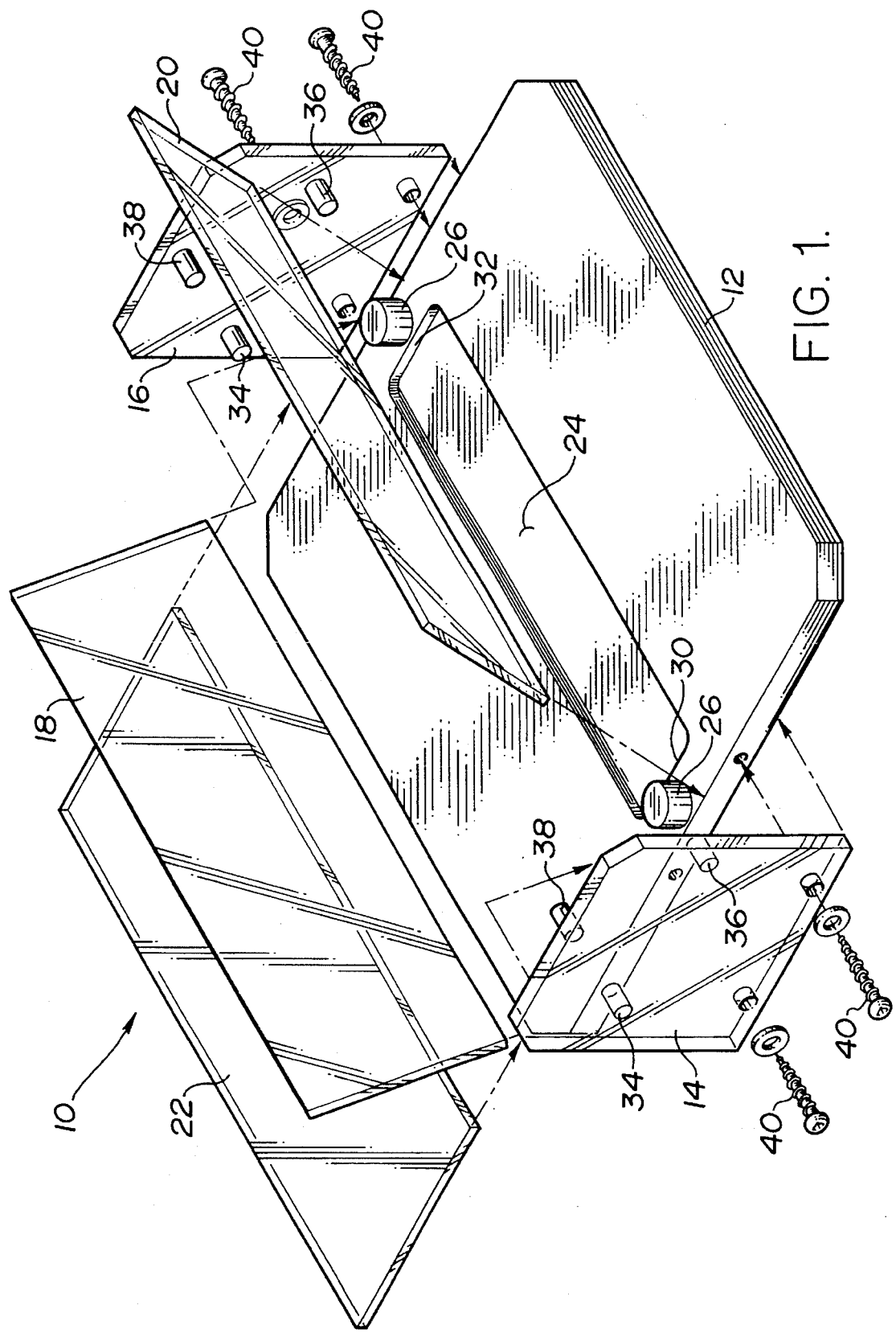
FIG. 1 is an exploded perspective view of a bird feeder construction kit in accordance with the teachings of the present invention.

The preferred embodiment, a bird feeder construction kit generally identified by reference numeral 10, will now be described with reference to FIGS. 1 and 2.

Referring to FIG. 1, bird feeder construction kit 10 includes a base 12, a pair of supports 14 and 16, and three rectangular plates 18, 20, and 22. Base 12 has a central trough-like depression 24. Pins 26 extend vertically from base 12 adjacent opposed ends 30 and 32, respectively, of depression 24. Supports 14 and 16 each have three projecting pins 34, 36, and 38. Screws 40 are provided for assembly as will hereinafter be further described.

Figure 2:
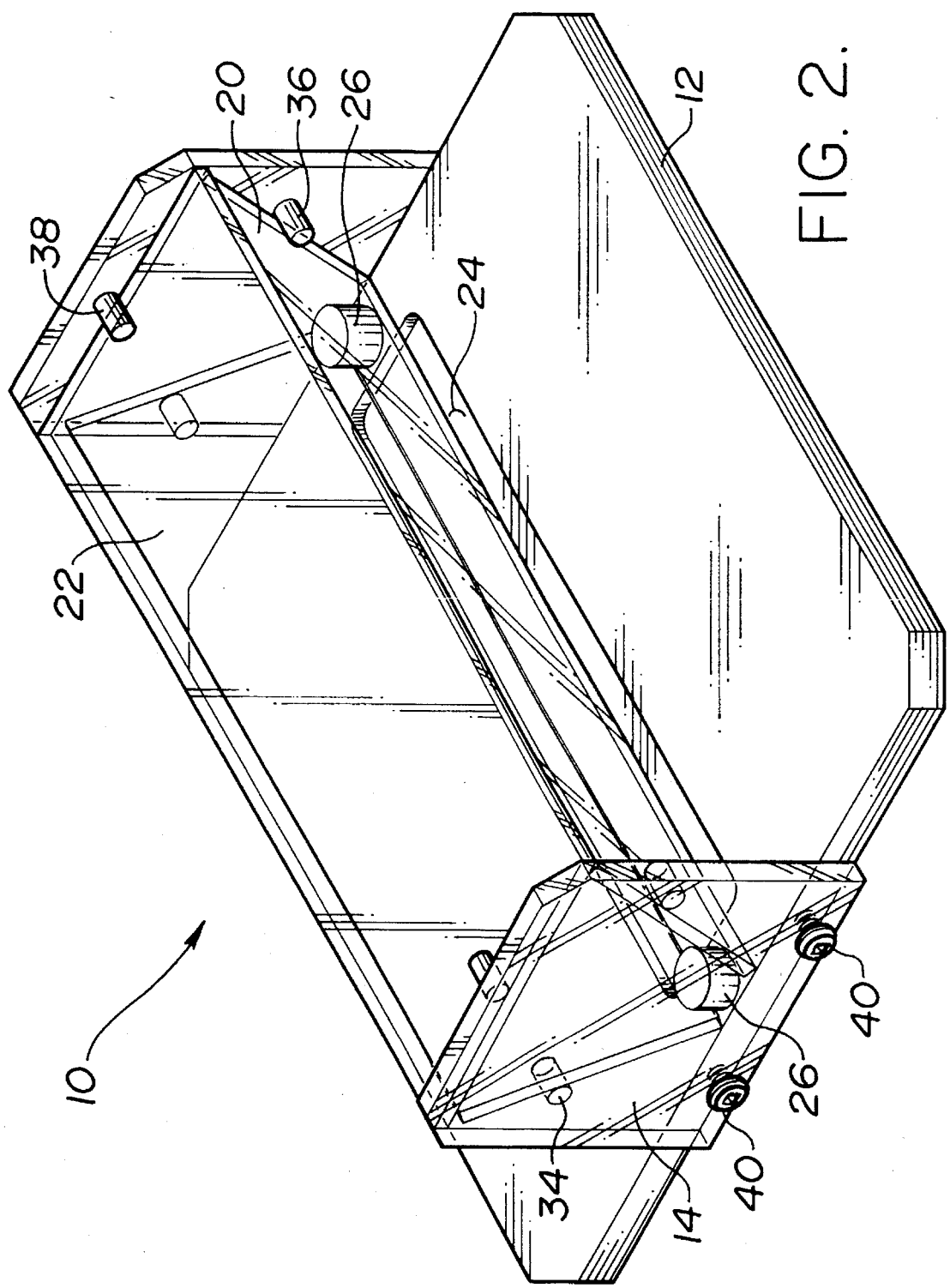
FIG. 2 is a perspective view of a bird feeder constructed from the kit illustrated in FIG. 1.

Referring to FIG. 2, in order to assembly bird feeder construction kit 10, supports 14 and 16 are vertically secured to base 12 by means of screws 40. Plate 18 is then slid into position resting against pins 26 and pins 34. Plate 20 is then slid into position resting against pins 26 and pins 36. Plate 22 is then slid into position resting on top of plates 18 and 20 and under pins 38. It is preferred that plates 18, 20, and 22 be transparent in order to provide a view of the level of feed remaining in the feeder.

It will be apparent to one skilled in the art that bird feeder construction kit 10, as illustrated in FIG. 1, can easily be packaged flat and sent through the mail. It will also be apparent to one skilled in the art that bird feeder construction kit 10 is remarkably easy to assemble. It will finally be apparent to one skilled in the art that modifications may be made to the illustrated embodiment without departing from the spirit and scope of the invention as defined by the claims.

The embodiments of the invention in which an exclusive property or privilege is claimed are as follows:

1. A method of building a bird feeder, comprising:

a. providing a substantially planar base having an elongate central slotted trough-like depression with vertically extending pins adjacent opposed ends of the depression;

b. providing a pair of supports vertically securable to the base, each support having three projecting pins that extend horizontally when each support is vertically positioned on the base, two of the three horizontally projecting pins being spaced apart on a common horizontal plane and one of the three horizontally projecting pins being positioned adjacent a top of each support intermediate the other two horizontally projecting pins; and c. providing three rectangular plates;

d. assembly comprising the steps of securing the supports vertically onto the base, resting two of the rectangular plates upon the base above the slotted depression, the plates extending upwardly at an angle from the base angularly supported by two of the three horizontally projecting pins on the supports, the plates being positioned above the depression spaced apart by the pins that extend vertically from the base, one of the plates extending horizontally over and being supported by the other two of the rectangular plates, the horizontal plate being held in place by the one of the three horizontally projecting pins positioned adjacent the top of each support.

2. A bird feeder, comprising:

a. a planar base having an elongate central slotted trough-like depression with vertically extending pins positioned adjacent opposed end of the depression;

b. a pair of supports vertically secured to the base, each support having three projecting pins that extend horizontally when the support is vertically positioned on the base, two of the three horizontally projecting pins being spaced apart on a common horizontal plane and one of the three horizontally projecting pins being positioned adjacent a top of each support intermediate the other two horizontally projecting pins; and c. three rectangular plates, two of the rectangular plates resting upon the base above the slotted depression, the plates extending upwardly at an angle from the base angularly supported by said two of the three horizontally projecting pins on the supports, the two plates being positioned above the depression spaced apart by the vertically extending pins on the base, the remaining one of the three plates extending horizontally over and being supported by the said two of the three rectangular plates, the horizontal plate being held in place by the one of the three horizontally projecting pins positioned adjacent the top of each support.

* * * * *